(12) United States Patent
Soukhostavets et al.

(10) Patent No.: US 11,615,656 B2
(45) Date of Patent: Mar. 28, 2023

(54) METHOD AND SYSTEM FOR DIAGNOSING AN ENGINE OR AN AIRCRAFT

(71) Applicant: PRATT & WHITNEY CANADA CORP., Longueuil (CA)

(72) Inventors: Egor Soukhostavets, Longueuil (CA); Daniel D'Anjou, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 573 days.

(21) Appl. No.: 16/723,529

(22) Filed: Dec. 20, 2019

(65) Prior Publication Data

US 2021/0192873 A1    Jun. 24, 2021

(51) Int. Cl.

| G07C 5/08 | (2006.01) |
| G06F 16/901 | (2019.01) |
| G06F 17/18 | (2006.01) |
| G07C 5/00 | (2006.01) |
| G06N 20/00 | (2019.01) |
| B64D 45/00 | (2006.01) |
| G08G 5/00 | (2006.01) |

(52) U.S. Cl.
CPC ........... *G07C 5/0816* (2013.01); *B64D 45/00* (2013.01); *G06F 16/9024* (2019.01); *G06F 17/18* (2013.01); *G06N 20/00* (2019.01); *G07C 5/006* (2013.01); *G08G 5/003* (2013.01)

(58) Field of Classification Search
None
See application file for complete search history.

(56) References Cited

U.S. PATENT DOCUMENTS

| 6,539,337 | B1 | 3/2003 | Provan et al. | |
| 8,255,100 | B2* | 8/2012 | Schimert | G05B 23/0254 |
| | | | | 702/183 |
| 8,996,340 | B2 | 3/2015 | Cheriere et al. | |
| 9,796,481 | B2* | 10/2017 | Dani | G07C 5/008 |
| 9,874,171 | B2* | 1/2018 | Bleile | F02D 41/18 |
| 10,060,831 | B2* | 8/2018 | Gouby | G01M 15/14 |
| 10,452,040 | B2 | 10/2019 | Kienzle | |
| 2021/0024224 | A1* | 1/2021 | Mohan | G07C 5/0808 |

FOREIGN PATENT DOCUMENTS

GB    2448351    10/2008

OTHER PUBLICATIONS

Extended European Search Report dated May 10, 2021, in counterpart EP application.

* cited by examiner

*Primary Examiner* — Todd Melton
(74) *Attorney, Agent, or Firm* — Norton Rose Fulbright Canada LLP

(57) ABSTRACT

Systems and methods for diagnosing an engine or an aircraft are described herein. Flight data of at least one of the engine and the aircraft is obtained. A graph-based representation modeling a mathematical relationship between parameters of at least one of the engine and the aircraft is obtained. The graph-based representation has a plurality of permutations. Output data for the plurality of permutations is generated based on the flight data. The output data for the plurality of permutations is compared and a fault is detected based on a discrepancy in the output data. A signal indicative of the fault is outputted in response to detecting the fault.

20 Claims, 8 Drawing Sheets

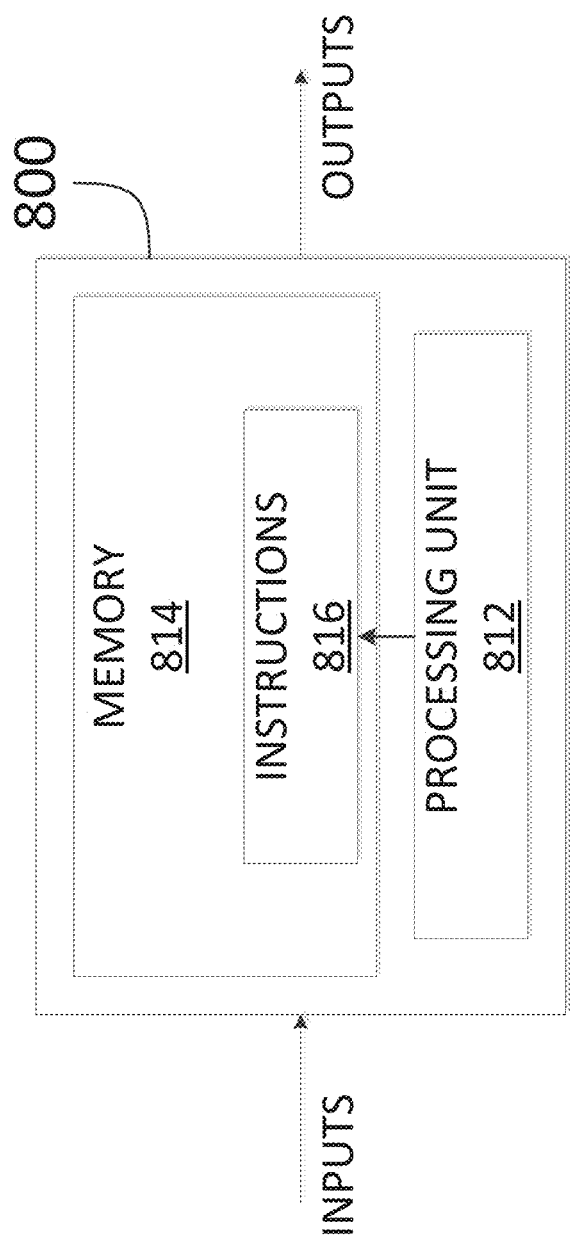

METHOD AND SYSTEM FOR DIAGNOSING AN ENGINE OR AN AIRCRAFT

TECHNICAL FIELD

The present disclosure relates generally to engines and aircrafts, and, more particularly, to methods and systems for diagnosing an engine or an aircraft.

BACKGROUND OF THE ART

Flight data of an aircraft may be collected during a flight test for an aircraft engine. The collected flight data may be offloaded from the aircraft after the flight test is completed, for further processing. The analysis performed on the offloaded flight data may be a complex and time consuming task. As such, there is room for improvement.

SUMMARY

In one aspect, there is provided a method for diagnosing an engine or an aircraft. The method comprises: obtaining flight data of at least one of the engine and the aircraft during operation of the engine on the aircraft; obtaining a graph-based representation modeling a mathematical relationship between parameters of at least one of the engine and the aircraft, the graph-based representation having a plurality of permutations; generating output data for the plurality of permutations based on the flight data; comparing the output data for the plurality of permutations to each other and from comparing the output data detecting a fault based on a discrepancy in the output data; and outputting a signal indicative of the fault in response to detecting the fault.

In one aspect, there is provided a system for diagnosing an engine or an aircraft. The system comprising a processing unit and a non-transitory memory communicatively coupled to the processing unit and comprising computer-readable program instructions. The computer-readable program instructions executable by the processing unit for: obtaining flight data of at least one of the engine and the aircraft during operation of the engine on the aircraft; obtaining a graph-based representation modeling a mathematical relationship between parameters of at least one of the engine and the aircraft, the graph-based representation having a plurality of permutations; generating output data for the plurality of permutations based on the flight data; comparing the output data for the plurality of permutations to each other and from comparing the output data detecting a fault based on a discrepancy in the output data; and outputting a signal indicative of the fault in response to detecting the fault.

DESCRIPTION OF THE DRAWINGS

Reference is now made to the accompanying figures in which:

FIG. 8 is an example computing device for implementing a method and/or system for diagnosing an engine or an aircraft, in accordance with one or more embodiments.

It will be noted that throughout the appended drawings, like features are identified by like reference numerals.

DETAILED DESCRIPTION

Figure 1:
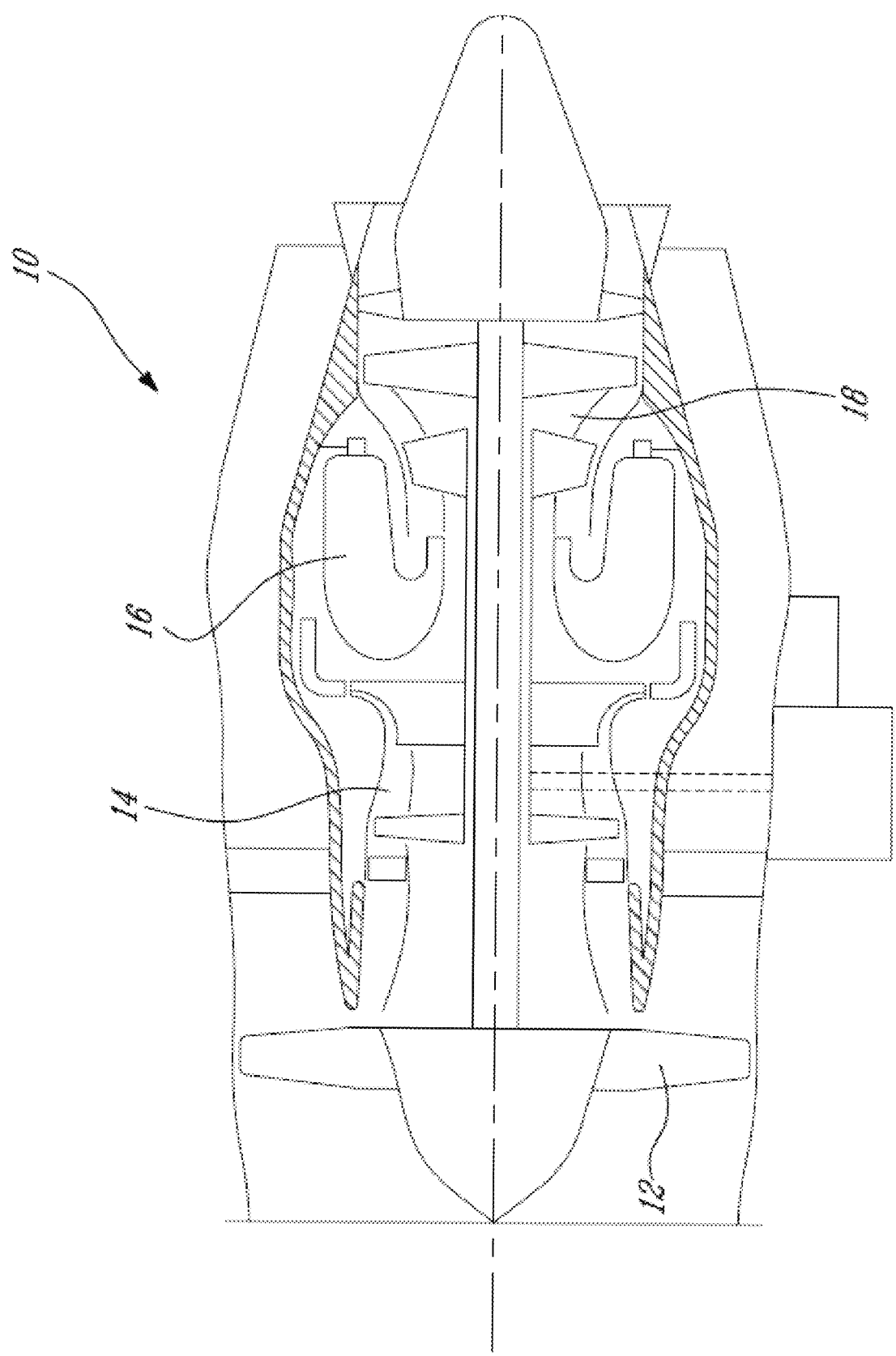
FIG. 1 is a schematic cross-sectional view of an example gas turbine engine, in accordance with one or more embodiments.

FIG. 1 illustrates a gas turbine engine 10, which may be used with the systems and methods for diagnosing an engine and/or an aircraft described herein. The engine 10 generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Note that while engine 10 is a turbofan engine, the systems and methods for diagnosing an engine and/or an aircraft may be applicable to turboprop engines, turboshaft engines, or other suitable types of aircraft engines.

Figure 2:
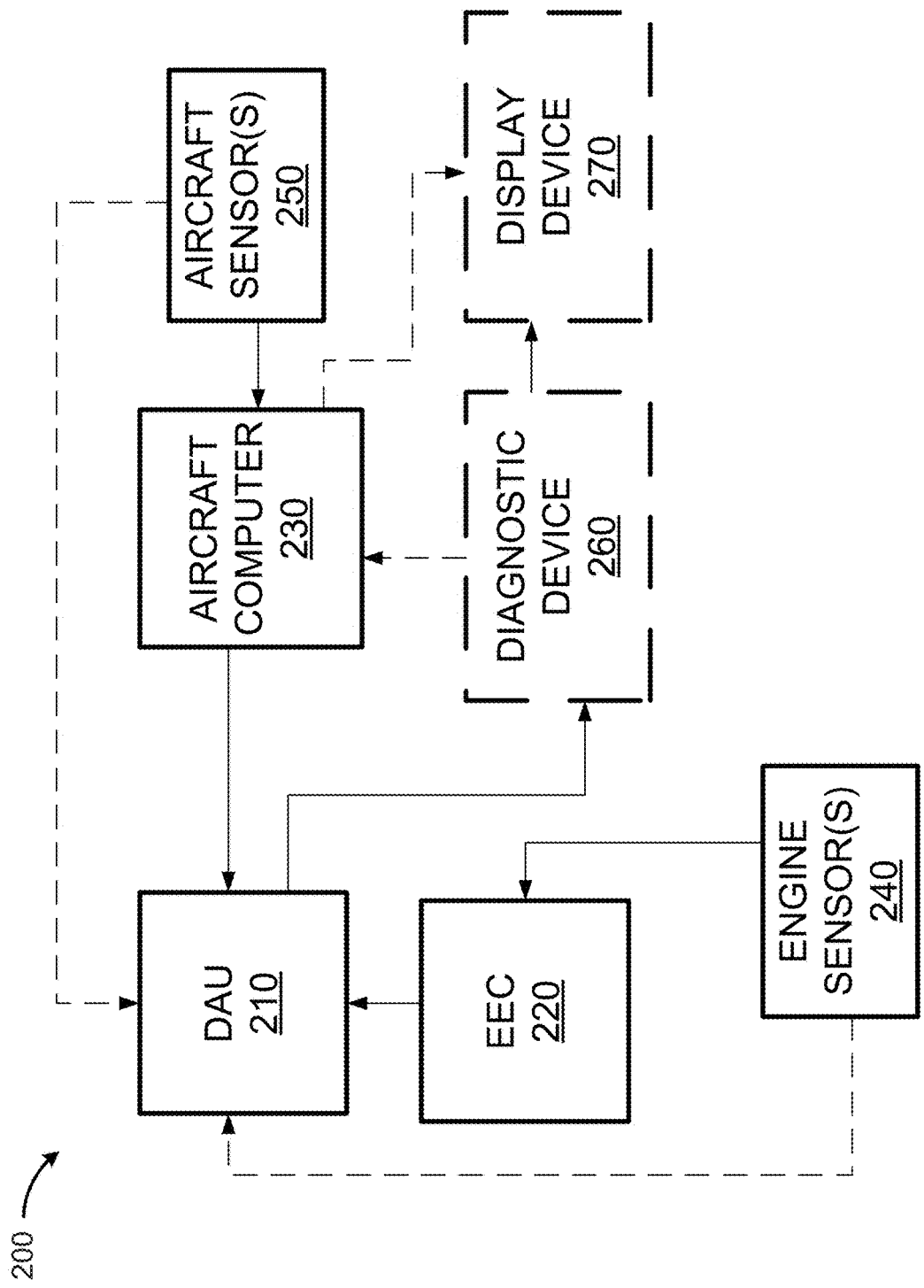
FIG. 2 is a schematic of an example system for diagnosing an engine and/or an aircraft, in accordance with one or more embodiments.

With reference to FIG. 2, a system 200 for diagnosing an engine, such as the engine 10 of FIG. 1, and/or an aircraft is illustrated. The aircraft may be any suitable aircraft adapted for operation with an aircraft engine, such as the engine 10. The system 200 is configured to obtain flight data of at least one of the engine 10 and the aircraft during operation. The flight data may be obtained during a flight test of the aircraft for testing of the engine 10 and/or the aircraft. The flight data may be obtained by the system 200 in real-time during operation of the aircraft and the engine 10. The system 200 is configured to obtain a graph-based representation modeling a mathematical relationship between parameters of at least one of the engine 10 and the aircraft. The system 200 is configured to generate output data for a plurality of permutations of the graph-based representation based on the flight data, compare the output data for the plurality of permutations, detect a fault based on a discrepancy in the output data, and output a signal indicative of the fault. Accordingly, the system 200 may be able to diagnose the engine 10 and/or the aircraft in real-time during engine and aircraft operation.

In the illustrated embodiment, the system 200 comprises a data acquisition unit (DAU) 210, which is used to collect the flight data. The DAU 210 may obtain flight data from an electronic engine controller (EEC) 220 and/or an aircraft computer 230. The EEC 220 may obtain flight data by obtaining measurements of one or more engine parameters from one or more engine sensors 240 connected to the EEC 220. The EEC 220 may determine one or more engine parameters from one or more measured engine parameters and/or one or more provided parameters. The EEC 220 may provide the measured engine parameters and/or any determined engine parameters to the DAU 210. In some embodiments, the DAU 210 may obtain measured engine parameters directly from the engine sensor(s) 240. The aircraft computer 230 may obtain flight data by obtaining measurements of one or more aircraft parameters from one or more aircraft sensors 250 connected to the aircraft computer 230. The aircraft computer 230 may determine one or more aircraft parameters from one or more measured aircraft parameters and/or one or more provided parameters. The aircraft computer 230 may provide the measured aircraft parameters and/or any determined aircraft parameters to the DAU 210. In some embodiments, the DAU 210 may obtain measured aircraft parameters directly from the aircraft sensor(s) 240. In some embodiments, the EEC 220 may determine and/or obtain one or more aircraft parameters, which may be provided to the DAU 210. Similarly, in some embodiments, the aircraft computer 230 may determine and/or obtain one or more engine parameters, which may be provided to the DAU 210. The engine and/or aircraft parameters obtained by the DAU 210 may vary depending on practical implementations. The engine and/or aircraft parameters may comprise one or more of engine temperature, interstage turbine temperature (ITT), engine speed, generator speed (N1), compressor speed (Ng), power turbine speed (N2), rotor speed, fuel flow (WF), oil pressure, oil temperature, air speed, ambient temperature, outside air temperature (OAT) or static air temperature, total ambient atmospheric temperature, total ambient atmospheric pressure, altitude, exhaust pressure, bleed flow, bleed pressure, bleed temperature, accessories loads and/or any other suitable engine and/or aircraft parameters. The pressure(s) and/or temperature(s) may be recorded from the engine, from the aircraft and/or from the boom.

The system 200 may comprise a diagnostic device 260 for diagnosing the engine 10 and/or the aircraft. More specifically, the diagnostic device 260 may process the flight data with the graph-based representation in order to diagnose the engine 10 and/or aircraft. The diagnostic device 260 may obtain the flight data from the DAU 210. The diagnostic device 260 may process the acquired flight data in real-time in order to detect a fault during operation of the engine 10 on the aircraft. The diagnostic device 260 may output a signal indicative of the fault. The signal may be output to a display device 270 for displaying of the fault. In some embodiments, the signal may be output to the aircraft computer 230 for generating an alert indicative of the fault and/or for causing the fault to be displayed. For example, the diagnostic device 260 may output the signal indicative of the fault to the aircraft computer 230 and the aircraft computer 230 may cause the display device 270 to display an indication of the fault. The display device 270 may be any suitable display, such as a flight display, a cathode-ray tube (CRT), a liquid-crystal display (LCD), a LED (light-emitting diode) or the like.

The diagnostic device 260 may obtain the graph-based representation from memory and/or a storage device having stored therein the graph-based representation. Accordingly, the graph-based representation may be generated prior to the operation of the engine 10 on the aircraft and stored for later use. In some embodiments, the graph-based representation may be obtained based on generating the graph-based representation during operation of the engine 10 on the aircraft. The graph-based representation may be generated from one or more equations of one or more parameters of the engine 10 and/or the aircraft. The graph-based representation has a plurality of permutations. The plurality of permutations may be generated prior to the operation of the aircraft and stored for later use or may be generated during operation of the aircraft.

With reference to FIGS. 3A to 3D, a specific and non-limiting example a plurality of permutations $300_1$, $300_2$, $300_3$, and $300_4$ of a graph-based representation is shown. In the example of FIGS. 3A to 3D the graph-based representation is a graph. In this example, an equation y=ax+b, may be written as $$x = \frac{(y-b)}{a}, b = y - ax, a = \frac{(y-b)}{x}.$$

Figure 3A:
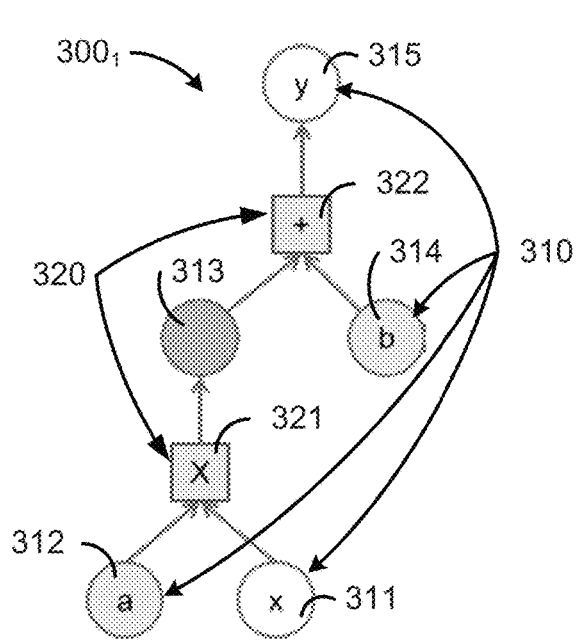
FIGS. 3A to 3D are graphs illustrating a plurality of permutations of a graph-based representation, in accordance with one or more embodiments.
Figure 3B:
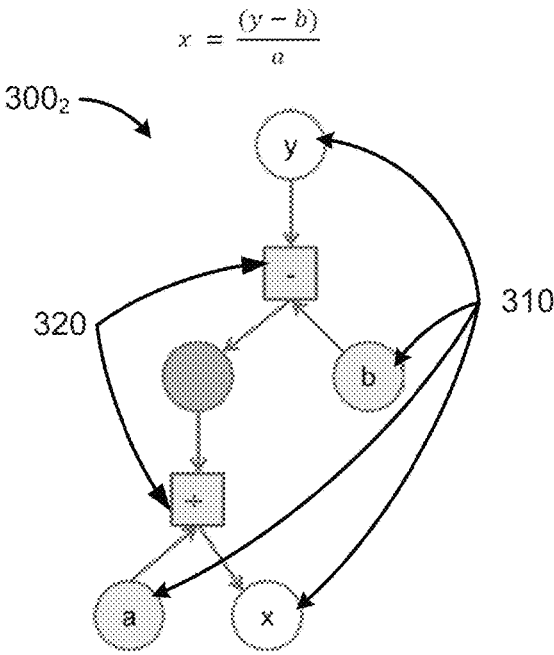

There are therefore four (4) permutations of the aforementioned equation. FIG. 3A illustrates the permutation for y=ax+b, FIG. 3B illustrates the permutation for $$x = \frac{(y-b)}{a},$$

Figure 3C:
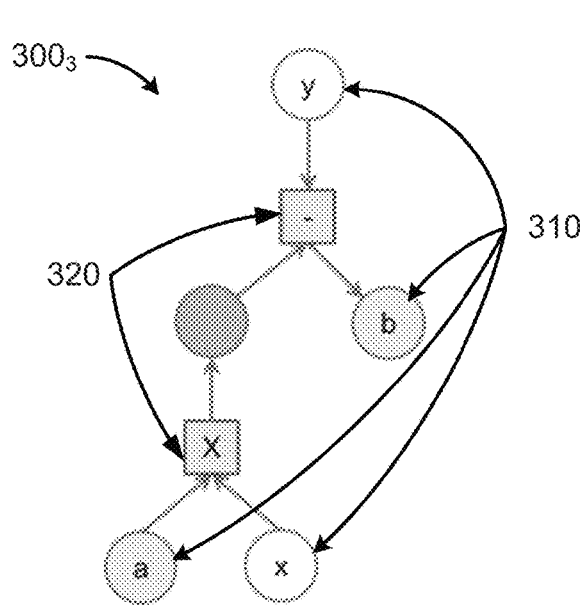
Figure 3D:
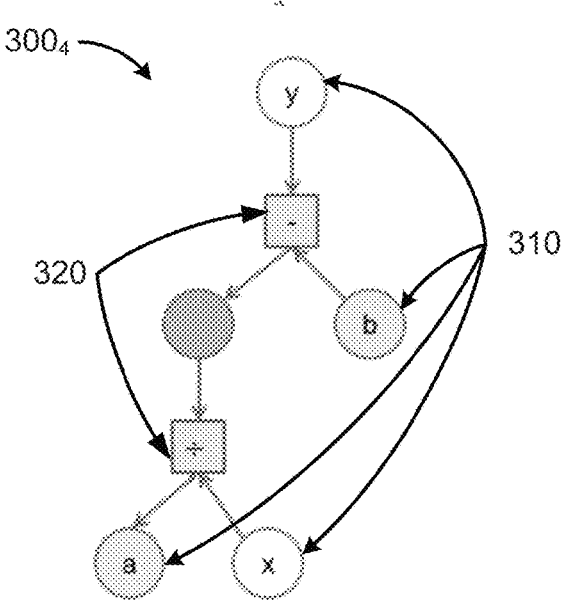

FIG. 3C illustrates the permutation for b=y−ax, and FIG. 3D illustrates the permutation for $$a = \frac{(y-b)}{x}.$$

The graphs shown in FIGS. 3A to 3D comprise a plurality of nodes 310 and junctions 320. In this example, the nodes 310 are illustrated as circles and the junctions 320 are illustrated as squares. Each one of the nodes 310 may have a node type. The node type may be any one of: a data node, a constant node, and an intermediate node. The data node is a node on which operations may be performed. The constant node is a node that contains a constant which may be used in operations performed on the data nodes or intermediate nodes. The intermediate node is a node that contains an intermediate calculated result. The data nodes and the constant nodes may be used as input nodes and/or output nodes. The junctions may define an operation to be performed on its inputs. Each one of the junctions 320 may have an operator type. The operator type may be any one of: addition, subtraction, multiplication, division, sin, tan, cos, exponential, log, or any other suitable mathematical operator. The graph may be defined such that the nodes 310 cannot be directly connected together and must be connected through a junction 320 and defined such that junctions 320 cannot be connected together and must be connected through a node 310. In FIGS. 3A to 3D, the graphs are directed graphs. Accordingly, each arrow of the graphs indicates the direction for both input and output data, as well as the order in which the graphs should be traversed.

Considering the graph of FIG. 3A, the nodes 311, 312, 314 are input nodes for the graph, the node 313 is an intermediate node of the graph, and the node 315 is an output node of the graph. In this example, the junction 321, performs its operation (i.e., multiplication) on the input from input nodes 311, 312 (i.e., the input data for the constant "a" and the variable "x"). The output of the junction 321 (i.e., the product of the input data for the constant "a" and the variable "x") is provided to intermediate node 313. Continuing with this example, the junction 322, performs its operation (i.e., addition) on the input from intermediate node 313 and input node 314 (i.e., the input data for "ax" and for the constant "b"). The output of the junction 322 (i.e., the addition of the input data for "ax" and for the constant "b") is provided to the output node 315.

The example illustrated in FIGS. 3A to 3D is a simplified example of a plurality of permutations of a graph-based representation. The graph-based representation and the permutations would vary depending on practical implementations. While FIGS. 3A to 3D illustrate the graph-based representation in the form of a graph, this is for example purposes only. The graph-based representation may be a graph, a system of equations, a data structure with a set of inputs and a set of outputs, or any other suitable representation for representing a graph.

Referring back to FIG. 2, the diagnostic device 260 may generate output data for the plurality of permutations of the graph-based representation based on the flight data. The diagnostic device 260 may obtain input data for the permutations from the flight data. The input data may be provided as input to the permutations in order to generate the output data. The input data may correspond to a given point in time (e.g., the time of the most recently available flight data), may be generated based on a time-weighted average of the flight data over a period of time, or may be generated or obtained in any other suitable manner from the flight data. In some embodiments, the flight data is preprocessed, for example, to assess validity of the flight data, check multiple input readings, and/or to remove outliers. In some embodiments, the flight data is preprocessed by converting the flight data into a desired format for input into the permutations of the graph-based representation (e.g., units adjusted, scaled, or re-scaled, etc.). In some embodiments, the flight data is preprocessed by combining multiple values of a given engine and/or aircraft parameter into one value. For example, the combination of multiple values may comprise taking an average of the multiple values. In some embodiments, the input data sources may have weights assigned thereto. The weights may correspond to a measure of trust of the values obtained by the input data sources. Accordingly, the combination of multiple values may comprise taking a weighted average of the multiple values.

Each permutation may have a set of input parameters (e.g., input nodes) and a set of output parameters (e.g., output nodes). The set of input parameters corresponds to one or more parameters of the engine 10 and/or aircraft. Similarly, the set of output parameters corresponds to one or more parameters of the engine 10 and/or aircraft. The set of input parameters for each permutation may be different. The set of output parameters may be a common (i.e., same) set of one or more parameters. Accordingly, each permutation may correspond to a version of the graph-based representation having a different set of one or more input parameters and a common set of at least one output parameter. The input data for the permutations may comprise a plurality of input data subsets. In other words, each permutation may have a respective input data subset. The input data subset for a given permutation may correspond to data for each of the input parameters (e.g., input nodes) of that given permutation. Accordingly, the input data subset may vary for each permutation. Each permutation may process its respective input data subset to generate the output data for the permutations. In other words, a given permutation may processes its respective input data subset to generate output data. Accordingly, the output data for the plurality of permutations may corresponds to a plurality of values for each of the output parameters (e.g., output nodes). In other words, by using the plurality of permutations, there may be more than one way to determine values for each parameter of a set of output parameters.

The diagnostic device 260 may compare the output data for the plurality of permutations and detect a fault based on a discrepancy in the output data. The output data may be processed in any suitable manner to perform the comparison in order to determine the discrepancy and to detect the fault. For instance, any suitable statistical analysis may be performed to assess consistency and/or inconsistency in the output data. For example, comparing the output data may comprise processing the output data to determine a statistical deviation in the output data. Continuing with this example, detecting the fault may comprise determining an input data source of the flight data causing the statistical deviation. In some embodiments, a machine-learning algorithm conditioned based on previous flight tests may be used. Accordingly, comparing the output data and detecting the fault may comprise processing the output data for the plurality of permutations with the machine-learning algorithm to detect the fault. The fault detected may vary depending on practical implementations. The fault may be with the engine 10 and/or with the aircraft. Detecting the fault may comprises determining a measurement error with an input data source. Detecting the fault may comprises determining that at least one engine and/or aircraft sensors is broken. Detecting the fault may comprises determining that at least one engine and/or aircraft sensors is installed incorrectly. Detecting the fault may comprises determining that the engine is installed incorrectly. The fault may be generated in order to detect a flight test procedure deviation. Accordingly, detecting the fault may comprises determining that a flight maneuver was incorrectly performed, which may indicate that the flight maneuver needs to be re-performed. In some embodiments, detecting the fault comprises determining that a flight maneuver and/or a specific inflight test should be re-performed. In response to detecting the fault, the diagnostic device 260 may output a signal indicative of the fault.

In some embodiments, a confidence score for the fault may be determined based on the discrepancy in the output data. The confidence score may be determined based on a likelihood that the fault is causing the discrepancy in the output data. For example, if there are a hundred (100) permutations and ninety (90) of the permutations have output data that are consistent with each other and ten (10) permutations have output data that is inconsistent, then it may be determined that there is a 90% chance that there is a fault. The confidence score may be determine in any suitable manner. For example, statistical or probabilistic analysis performed on the output data may be used to determine the confidence score. The confidence score may similarly be output via a signal indicative of the confidence. The signal may be outputted to the display device 270 to cause the display of the confidence score for the fault.

Figure 4:
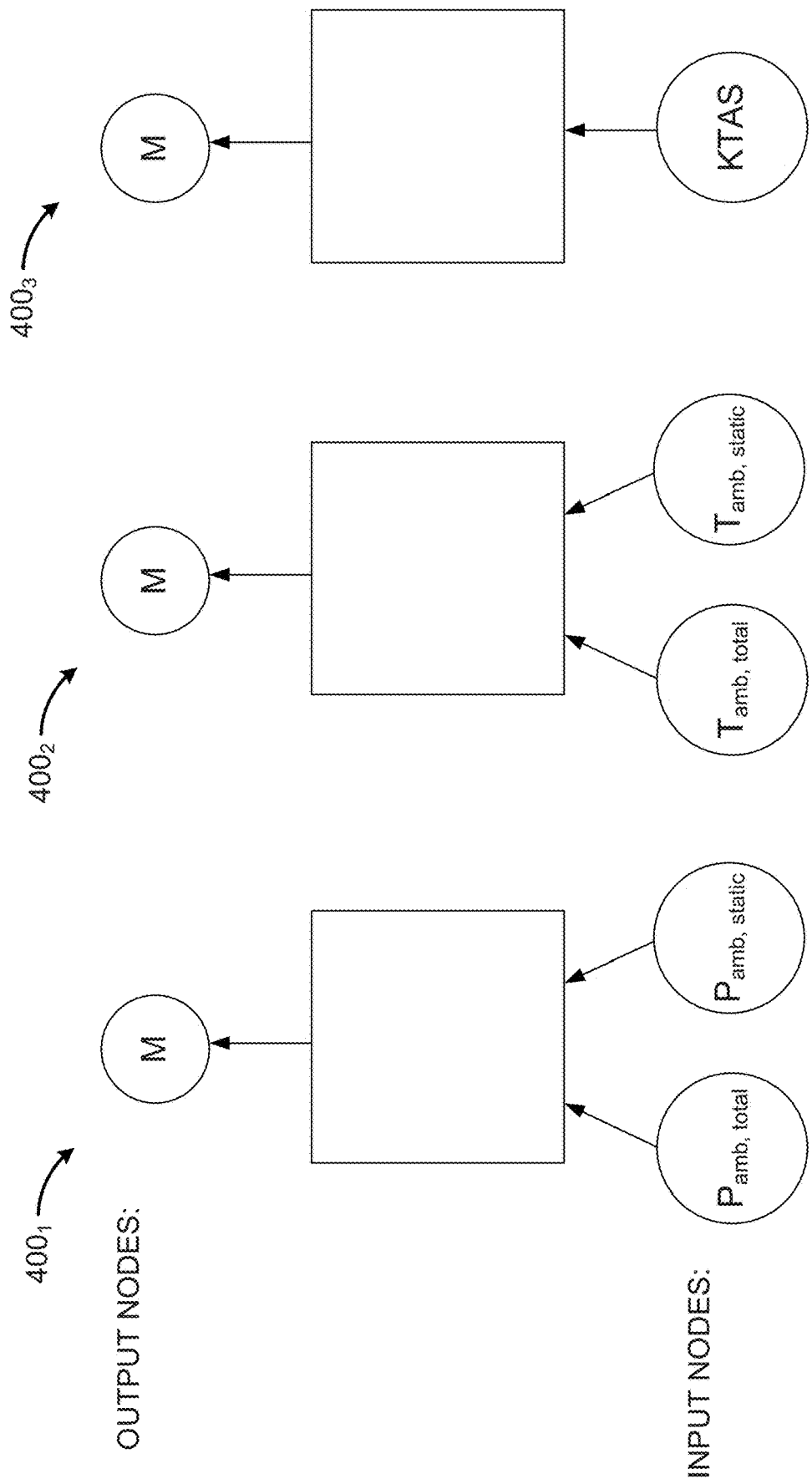
FIG. 4 illustrates a plurality of permutations for determining Mach number, in accordance with one or more embodiments.

With reference to FIG. 4, a specific and non-limiting example of the process of generating the output data, comparing the output data and detecting the fault will now be presented. In this example, three (3) permutations $400_1$, $400_2$, $400_3$ of a graph modeling a mathematical relationship between engine and/or aircraft parameters are shown for generating output data for a Mach number (i.e., three values for the Mach number). In this example, only the input nodes and the output nodes are illustrated in FIG. 4. The intermediate nodes, constant nodes, and operator junctions are omitted for the sake of brevity in FIG. 4, and are replaced with square blocks. The first permutation $400_1$ is able to calculate Mach number M based on ambient total and static pressure $P_{amb,\ total}$ and $P_{amb,\ static}$, as a mathematical relationship between Mach number M, ambient total pressure $P_{amb,\ total}$ and ambient static pressure $P_{amb,\ static}$ is known by the following equation:

$$M = \sqrt{\frac{2}{\gamma-1} \times \left(\left(\frac{P_{amb,total}}{P_{amb,static}}\right)^{\frac{\gamma-1}{\gamma}} - 1\right)}, \quad (1)$$

where γ corresponds to the ratio of specific heats, and may be represented as $\gamma = C_p/C_v$. The value for γ may be a constant for a given set of ambient conditions and/or may vary as gas properties change.

The second permutation $400_2$ is able to calculate Mach number M based on ambient total and static temperature $T_{amb,\ total}$ and $T_{amb,\ static}$, as a mathematical relationship between Mach number M, ambient total temperature $T_{amb,\ total}$ and ambient static temperature $T_{amb,\ static}$ is known by the following equation:

$$M = \sqrt{\frac{2}{\gamma - 1} \times \left(\frac{T_{amb,total}}{T_{amb,static}} - 1\right)} \qquad (2)$$

The third permutation $400_3$ is able to calculate Mach number M based on true airspeed KTAS, as a mathematical relationship between Mach number M and true airspeed KTAS is known by the following equation:

$$KTAS = M \times 661.474[\text{knots}] \times \sqrt{\theta}, \qquad (3)$$

where θ corresponds to a ratio between a given temperature and a reference temperature. In other words, θ is a dimensionless temperature ratio.

In the case that $P_{amb,\ total}$=15 psia, $P_{amb,\ static}$=10 psia, $T_{amb,\ total}$=564 R, $T_{amb,\ static}$=500 R; then, the Mach number M for each of the permutations $400_1$, $400_2$, $400_3$ is 0.784, 0.800 and 0.800, respectively. As the output data for all of the permutations $400_1$, $400_2$, $400_3$ are not substantially the same, there is a discrepancy in the output data from the permutations $400_1$, $400_2$, $400_3$. More specifically, the output data for the permutation $400_1$, $400_2$, $400_3$ can be compared to each other to determine the discrepancy in the output data. As the Mach number for the first permutation $400_1$ differs from the Mach numbers of the second and third permutation $400_2$, $400_3$ and the Mach numbers of the second and third permutation $400_2$, $400_3$ are the same, it can be determined that the discrepancy with the output data is with the first permutation $400_1$. A fault can then be detected based on determining that the first permutation $400_1$ is causing the discrepancy. In this example, as the input of the first permutation $400_1$ is $P_{amb,\ total}$ and $P_{ab,\ static}$ and the other permutations $400_2$, $400_3$ do not have $P_{amb,\ total}$ and $P_{amb,\ static}$ as inputs, it can be determined that the fault is likely being caused by an error with a pressure sensor. A confidence score may be determined for the fault at 66.7% as two of the three permutations have output data that is consistent.

Figure 5:
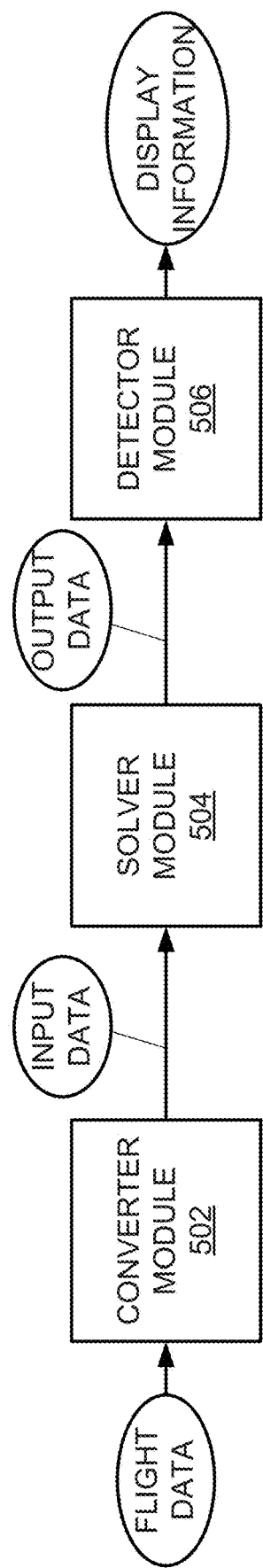
FIG. 5 is a block diagram of exemplary modules for diagnosing an engine and/or an aircraft, in accordance with one or more embodiments.

With reference to FIG. 5, a specific and non-limiting example of implementation of the diagnostic device 260 of FIG. 2 is shown. In this example, a converter module converts the flight data into the input data for the plurality of permutations. The converter module 502 may select data at a given point in time from the flight data, take a time-weighted average of flight data, remove outliers, convert the flight data into a suitable input format for the permutations, combine multiple values for a given parameter into one value and/or the like. Accordingly, the converter module 502 may be programmed to accept flight data in any format and covert the flight data into a suitable input format for the permutations. The converter module 502 may generate the input data subsets for the permutations. The converter module 502 provides the input data to a solver module 504. The solver module 504 solves each of the plurality of permutations with the input data. The solver module 504 may solve each permutation with its respective input data subset in order to generate the output data for the permutations. The solver module 504 provides the output data for the permutations to the detector module 506. The detector module 506 compares the output for the permutations in order to determine any discrepancies in the output data. The detector module 506 detects a fault when there is a discrepancy in the output data. The detector module 506 may perform any suitable statistical analysis in order to determine any discrepancy in the output data. The detector module 506 may detect the discrepancy in the output data based on using past engine tests information (e.g., by processing the output data with a machine learning algorithm condition based on based on previous engine tests). The detector module 506 may determine the confidence score for the fault based on the discrepancy. The detector module 506 may perform error checking and/or data validation on the output data in order to detect the discrepancy. The detector module 506 may identify a source that is causing the discrepancy in the output data. In some embodiments, the detector module 506 determines that there is no discrepancy and that the flight data is of acceptable quality. A signal may be output which indicates that the flight data is of acceptable quality during the flight test. The signal may be received at the display device 270, which may display an indication that the flight data is of acceptable quality. The detector module 506 may output any suitable information for display on the display device 270. The information for display may comprise any one or more of: an indication of a fault, a confidence score for the fault, one or more the permutations in a graphical format illustrating the input data and/or output data, plots and/or tables of the output data and any other suitable information.

Referring back to FIG. 2, in some embodiments, the diagnostic device 260 may be omitted and the functionality of the diagnostic device 260 may be implemented by any suitable engine and/or aircraft computer, such as the EEC 220 and/or the aircraft computer 230. In some embodiments, the DAU 210 collects flight data of the aircraft without collecting flight data of the engine. Similarly, in some embodiments, the DAU 210 collects flight data of the engine without collecting flight data of the aircraft. In other words, flight data for one or both of the engine 10 and aircraft may be obtained depending on practical implementations. In some embodiments, the DAU 210 may be omitted and the functionally of the DAU 210 may be implemented by any suitable engine and/or aircraft computer, such as the EEC 220 and/or the aircraft computer 230. In some embodiments, the DAU 210 may be provided as part of the EEC 220 and/or the aircraft computer 230. The system 200 may vary depending on practical implementations and various aspects illustrated in FIGS. 2 and 5 may be omitted and/or combined.

Figure 6:
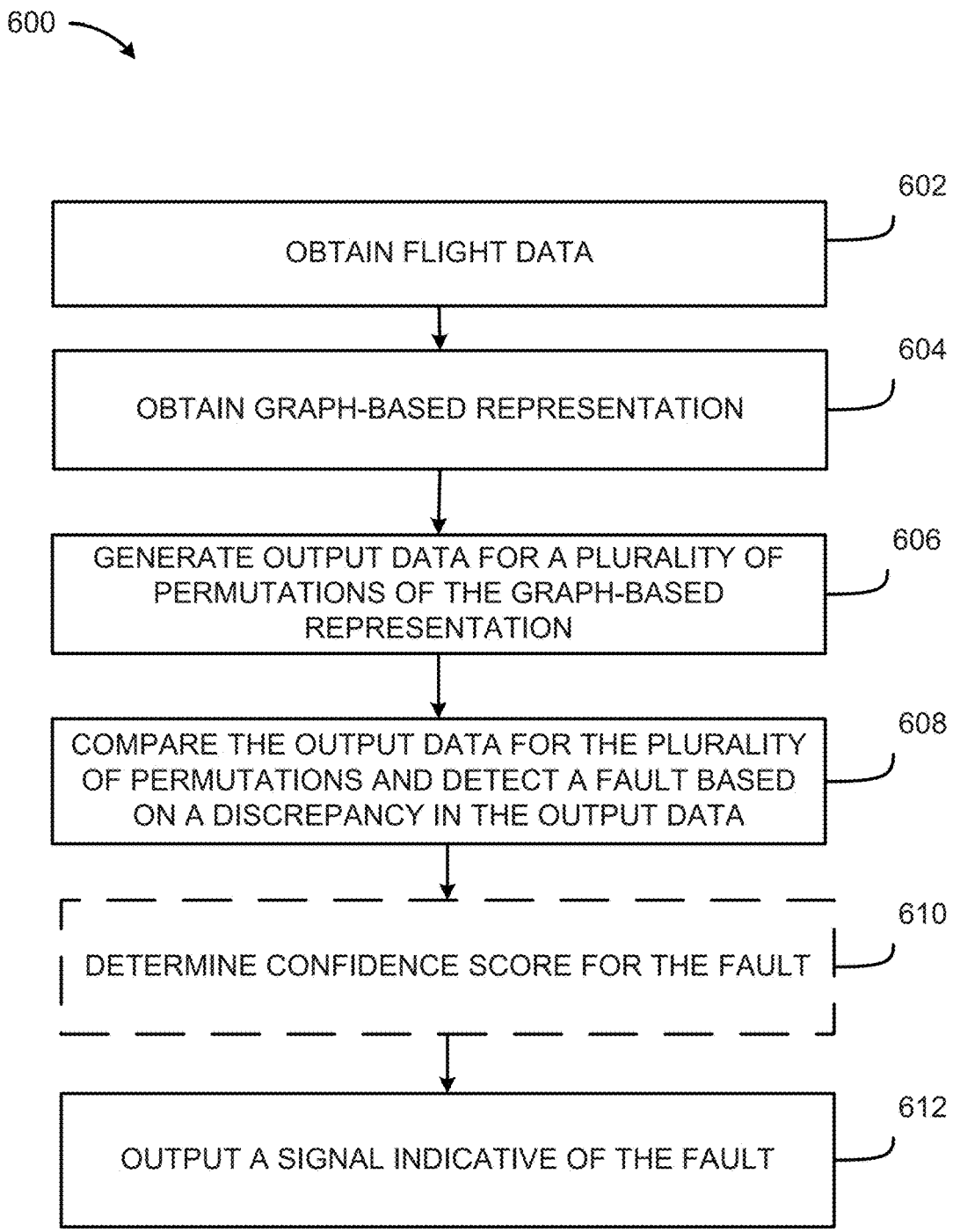
FIG. 6 is a flowchart illustrating an example method for diagnosing an engine and/or an aircraft, in accordance with one or more embodiments.

With reference to FIG. 6 there is shown a flowchart illustrating an example method 600 for diagnosing of an engine, such as the engine 10 of FIG. 1, and/or an aircraft. While the method 600 is described herein with reference to the engine 10 of FIG. 1, this is for example purposes only. The method 600 may be applied to any suitable aircraft engine and to any suitable aircraft. At step 602, flight data of at least one of the engine 10 and the aircraft is obtained during operation of the engine 10 on the aircraft. In some embodiments, obtaining the flight data comprises obtaining the flight data from a plurality of engine sensors and from at least one aircraft computer connected to a plurality of aircraft sensors. The flight data may be obtained as described elsewhere in this document.

At step 604, a graph-based representation is obtained. The graph-based representation models a mathematical relationship between parameters of at least one of the engine 10 and the aircraft. The graph-based representation has a plurality of permutations. The graph-based representation may be obtained as described elsewhere in this document. The graph-based representation may be generated before a flight test begins or may be generated during the flight test. Generation of the graph-base representation may comprise encoding mathematical relationships between engine and/or aircraft parameters.

At step 606, output data for the plurality of permutations is generated based on the flight data. The output data may be generated as described elsewhere in this document.

At step 608, the output data for the plurality of permutations is compared to each other and from the comparison a fault is detected based on a discrepancy in the output data. In some embodiments, comparing the output data comprises processing the output data to determine a statistical deviation in the output data. In some embodiments, detecting the fault comprises determining an input data source of the flight data causing the statistical deviation. In some embodiments, comparing the output data comprises processing the output data for the plurality of permutations with a machine-learning algorithm to detect the fault. In some embodiments, detecting the fault comprises determining that at least one engine or aircraft sensors is broken. In some embodiments, detecting the fault comprises determining that at least one engine or aircraft sensors is installed incorrectly. In some embodiments, detecting the fault comprises determining that the engine is installed incorrectly. In some embodiments, detecting the fault comprises determining that a flight maneuver was incorrectly performed. The comparison of the output data and/or the detection of the fault may be as described elsewhere in this document.

In some embodiments, at step 610, the method 600 further comprises determining a confidence score for the fault based on the discrepancy in the output data. The confidence score may be determined as described elsewhere in this document.

At step 612, a signal indicative of the fault is output. The signal may further be indicative of the confidence score for the fault. The signal may be output as described elsewhere in this document.

The order of the steps of the method 600 may vary depending on practical implementations. For example, step 604 may be performed prior to step 602.

It should be appreciated that the system 200 and/or method 600 may allow for diagnosing of an engine or an aircraft in real-time during operation of the engine on the aircraft inflight during a flight test. This may allow for quicker problem identification and may allow for prompt corrective action inflight. This may also allow for insight as a flight test progresses, rather than having to wait for the flight test to be completed and the flight data to be offloaded from the aircraft in order to analyze the data.

Figure 7:
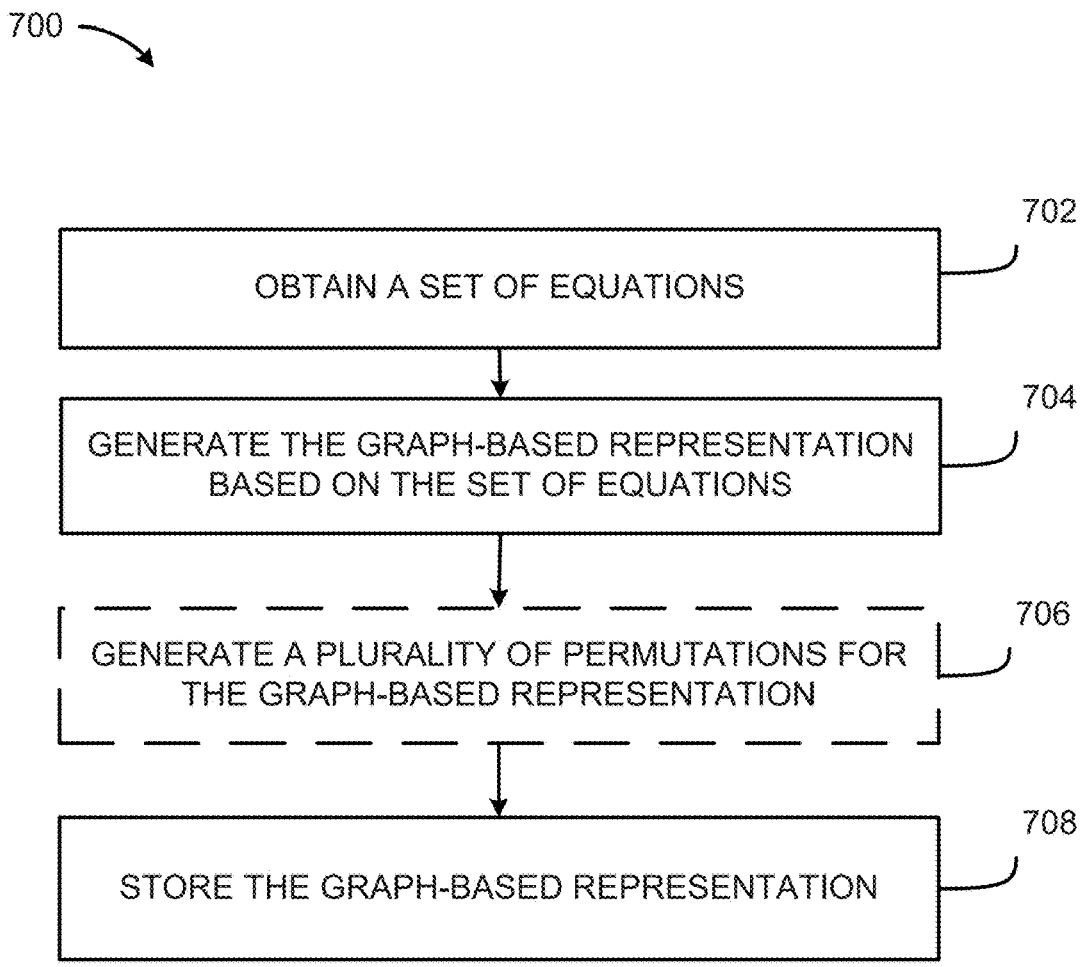
FIG. 7 is a flowchart illustrating an example method for generating a graph-based representation, in accordance with one or more embodiments.

With reference to FIG. 7 there is shown a flowchart illustrating an example method 700 for generating a graph-based representation. While the method 700 is described herein with reference to the engine 10 of FIG. 1, this is for example purposes only. At step 702, a set of equations are obtained. The set of equations correspond to one or more equations having parameters of at least one of the engine 10 and the aircraft. By way of a specific and non-limiting example, the set of equations could correspond to equations (1), (2), and (3) presented above. The set of equations varies depending on practical implementations. The engine and/or aircraft parameters of the set of equations may correspond to the engine and/or aircraft parameters measured and/or determined that form the flight data. Accordingly, each engine and/or aircraft parameters of the set of equations may have at least one measurement and/or determined value provided by the flight data.

At step 704, a graph-based representation modeling a mathematical relationship between parameters of at least one of the engine 10 and the aircraft is generated based on the set of equations. The set of equations may be processed to determine the mathematical relationship between the engine and/or aircraft parameters of the set of equations. The mathematical relationship between the engine and/or aircraft parameters may then be encoded into the graph-based representation. For example, using the definitions of the nodes described elsewhere in this document (i.e., data node, constant node, and intermediate node), the engine and/or aircraft parameters from the set of equations are assigned to the data nodes, and the mathematical operators from the set of equations are assigned to the junction nodes. Continuing with this example, constants in the set of equations are assigned to constant nodes and intermediate nodes may be generated to store the results from the junction nodes.

At step 706, a plurality of permutations for the graph-based representation is generated. The permutations generated may correspond to all of the different version of the graph-based representation that can be fully solved. For example, the permutations generated may correspond to different versions of the graph-based representation that can be solved with the measured and/or determined engine and/or aircraft parameters of the flight data. The permutations generated may correspond to a subset of all of the different version of the graph-based representation that can be fully solved. For example, the permutations generated may correspond to different version of the graph-based representation that can be solved for at least one engine and/or aircraft parameter. In some embodiments, the graph-based representation is transformed in order to determine the plurality of permutations. A set of rules may be used to transform the graph-based representation into the permutations. For example, the rules may comprise: an operator node rule—an operation node can accept only two inputs and can generate only one output; an operation order rule—an operation node is given an order in which it accepts input variables; a flow reversal rule: when the direction of an arrow in the graph is changed, the corresponding operator node has to be converted into its opposite (e.g., multiplication into division, addition to subtraction, sin to arc sin, etc.); and an operation reversal rule: when the direction of an arrow of the graph is changed, that variable takes precedence in the operator junction. Based on the set of rules the graph-based representation may be processed to determine the plurality of permutations. The set of rules may vary depending on practical implementations. In some embodiments, one or more rules may be added to the set of rules noted above and/or one or more rules may be omitted from the set of rules noted above.

At step 708, the graph-based representation is stored in memory and/or a storage device. Similarly, the plurality of permutations may be stored. The graph-based representation and/or the permutations may later be retrieved for diagnosing the engine 10 and/or the aircraft.

The methods and systems described herein may be applicable for in service engines and/or for flight testing. The methods and systems described herein may be applicable for analysis inflight and/or for analysis offloaded from the aircraft.

With reference to FIG. 8, the system 200, the method 600 and/or the method 700 may be implemented using at least one computing device 800. For example, the DAU 210, the EEC 220, the aircraft computer 230, and/or the diagnostic device 260 may each be implemented by at least one computing device 800. The computing device 800 comprises a processing unit 812 and a memory 814 which has stored therein computer-executable instructions 816. The processing unit 812 may comprise any suitable devices such that instructions 816, when executed by the computing device 800 or other programmable apparatus, may cause at least in part the functions/acts/steps of the method 600 and/or 700 as described herein to be executed. The processing unit 812 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 814 may comprise any suitable known or other machine-readable storage medium. The memory 814 may comprise non-transitory computer readable storage medium, for example, but not limited to, an electronic, magnetic, optical, electromagnetic, infrared, or semiconductor system, apparatus, or device, or any suitable combination of the foregoing. The memory 814 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 814 may comprise any storage means (e.g., devices) suitable for retrievably storing machine-readable instructions 816 executable by processing unit 812. In some embodiments, the computing device 800 can be implemented as part of a full-authority digital engine controls (FADEC) or other similar device, including an electronic engine controller (EEC), an engine control unit (ECU), and the like.

The methods and systems for diagnosing an engine or an aircraft described herein may be implemented in a high level procedural or object oriented programming or scripting language, or a combination thereof, to communicate with or assist in the operation of a computer system, for example the computing device 800. Alternatively, the methods and systems for diagnosing an engine or an aircraft may be implemented in assembly or machine language. The language may be a compiled or interpreted language. Program code for implementing the methods and systems for diagnosing an engine or an aircraft may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for diagnosing an engine or an aircraft may also be considered to be implemented by way of a non-transitory computer-readable storage medium having a computer program stored thereon. The computer program may comprise computer-readable instructions which cause a computer, or in some embodiments the processing unit 812 of the computing device 800, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, one or more of the steps of the methods 600 and/or 700 may be omitted and/or combined. By way of another example, various aspects of the system 200 may be omitted and/or combined. Yet further modifications could be implemented by a person of ordinary skill in the art in view of the present disclosure, which modifications would be within the scope of the present technology.

What is claimed is:

1. A method for diagnosing an engine or an aircraft, the method comprising:
   obtaining flight data of at least one of the engine and the aircraft during operation of the engine on the aircraft;
   obtaining a graph-based representation modeling a mathematical relationship between parameters of at least one of the engine and the aircraft, the mathematical relationship having a plurality of permutations;
   using the graph-based representation to generate the plurality of permutations of the mathematical relationship;
   generating output data for the plurality of permutations based on the flight data;
   comparing the output data for the plurality of permutations to each other;
   from comparing the output data, detecting a fault based on a discrepancy in the output data; and
   outputting a signal indicative of the fault in response to detecting the fault.

2. The method of claim 1, wherein comparing the output data comprises processing the output data to determine a statistical deviation in the output data.

3. The method of claim 2, wherein detecting the fault comprises determining an input data source of the flight data causing the statistical deviation.

4. The method of claim 1, wherein comparing the output data comprises processing the output data for the plurality of permutations with a machine-learning algorithm to detect the fault.

5. The method of claim 1, further comprising determining a confidence score for the fault based on the discrepancy in the output data.

6. The method of claim 1, wherein detecting the fault comprises determining that at least one engine or aircraft sensors is broken.

7. The method of claim 1, wherein detecting the fault comprises determining that at least one engine or aircraft sensors is installed incorrectly.

8. The method of claim 1, wherein detecting the fault comprises determining that the engine is installed incorrectly.

9. The method of claim 1, wherein detecting the fault comprises determining that a flight maneuver was incorrectly performed.

10. The method of claim 1, wherein obtaining the flight data comprises obtaining the flight data from a plurality of engine sensors and from at least one aircraft computer connected to a plurality of aircraft sensors.

11. A system for diagnosing an engine or an aircraft, the system comprising:
- a processing unit; and
- a non-transitory memory communicatively coupled to the processing unit and comprising computer-readable program instructions executable by the processing unit for:
  - obtaining flight data of at least one of the engine and the aircraft during operation of the engine on the aircraft;
  - obtaining a graph-based representation modeling a mathematical relationship between parameters of at least one of the engine and the aircraft, the mathematical relationship having a plurality of permutations;
  - using the graph-based representation to generate the plurality of permutations of the mathematical relationship;
  - generating output data for the plurality of permutations based on the flight data;
  - comparing the output data for the plurality of permutations to each other;
  - from comparing the output data, detecting a fault based on a discrepancy in the output data; and
  - outputting a signal indicative of the fault in response to detecting the fault.

12. The system of claim 11, wherein comparing the output data comprises processing the output data to determine a statistical deviation in the output data.

13. The system of claim 12, wherein detecting the fault comprises determining an input data source of the flight data causing the statistical deviation.

14. The system of claim 11, wherein comparing the output data comprises processing the output data for the plurality of permutations with a machine-learning algorithm to detect the fault.

15. The system of claim 11, wherein the computer-readable program instructions are further executable by the processing unit for determining a confidence score for the fault based on the discrepancy in the output data.

16. The system of claim 11, wherein detecting the fault comprises determining that at least one engine or aircraft sensors is broken.

17. The system of claim 11, wherein detecting the fault comprises determining that at least one engine or aircraft sensors is installed incorrectly.

18. The system of claim 11, wherein detecting the fault comprises determining that the engine is installed incorrectly.

19. The system of claim 11, wherein detecting the fault comprises determining that a flight maneuver was incorrectly performed.

20. The system of claim 11, wherein obtaining the flight data comprises obtaining the flight data from a plurality of engine sensors and from at least one aircraft computer connected to a plurality of aircraft sensors.

* * * * *